United States Patent [19]
Takeuchi et al.

[11] Patent Number: 5,976,273
[45] Date of Patent: Nov. 2, 1999

[54] HARD MAGNETIC MATERIAL

[75] Inventors: Akira Takeuchi; Tao Zhang, both of Miyagi-ken; Akihisa Inoue, 11-806 Kawauchijutaku, 35banchi, Motohasekura, Kawauchi, Aoba-ku, Sendai-shi, Miyagi-ken, all of Japan

[73] Assignees: Alps Electric Co., Ltd.; Akihisa Inoue

[21] Appl. No.: 08/882,062

[22] Filed: Jun. 25, 1997

[30] Foreign Application Priority Data

Jun. 27, 1996 [JP] Japan .................................. 8-168050

[51] Int. Cl.$^6$ ....................................................... H01F 1/057
[52] U.S. Cl. ............................ 148/302; 420/83; 420/121
[58] Field of Search ............................ 148/302; 420/83, 420/121

[56] References Cited

U.S. PATENT DOCUMENTS

| | | | |
|---|---|---|---|
| 4,402,770 | 9/1983 | Koon | 148/302 |
| 5,022,939 | 6/1991 | Yajima et al. | 148/302 |
| 5,049,208 | 9/1991 | Yajima et al. | 148/302 |
| 5,089,065 | 2/1992 | Hamano et al. | 148/302 |
| 5,135,584 | 8/1992 | Fujiwara | 148/301 |
| 5,449,417 | 9/1995 | Shimizu et al. | 148/302 |

*Primary Examiner*—John Sheehan
*Attorney, Agent, or Firm*—Brinks Hofer Gilson & Lione

[57] ABSTRACT

A hard magnetic material of the present invention contains Fe as a main component and further contains elements R and L, and B. Not less than 60% of the structure of the hard magnetic material is composed of a fine crystalline phase having an average grain size of not more than 100 nm and the rest is composed of an amorphous phase. The fine crystalline phase essentially consists of bcc-Fe and contains at least $R_2Fe_{14}B_1$.

7 Claims, 16 Drawing Sheets

HARD MAGNETIC MATERIAL

BACKGROUND OF THE INVENTION

1. Field of the Invention

The present invention relates to a hard magnetic material and a method of producing such a material, which hard magnetic material essentially consists of Fe and exhibits excellent magnetic characteristics over a wide composition range.

2. Description of the Prior Art

Although production costs of generally used ferrite magnets are low, the magnetic characteristics thereof are unsatisfactory. Quenched Nd—Fe—B magnets are known to have superior magnetic characteristics to ferrite magnets. In addition, new types of alloy magnets such as Sm-Fe-N magnets have been investigated for achieving more superior characteristics.

However, for example, according to the above quenched Nd—Fe—B magnets, it is difficult to reliably produce a hard magnetic material having excellent magnetic characteristics. This is because in spite of superior magnetic characteristics to the ferrite magnets, the quenched Nd—Fe—B magnets, which are prepared by quenching to form an amorphous phase and then heat-treated to precipitate a fine crystalline phase, cannot form a single amorphous phase after quenching. Thus, the crystalline structure formed by heat treatment readily becomes uneven.

SUMMARY OF THE INVENTION

Given the above-described problems, an object of the present invention is to provide a hard magnetic material having excellent magnetic characteristics over a wide composition range with superior magnetic characteristics to ferrite magnets.

A hard magnetic material of the present invention contains: Fe as a main component; at least one element R selected from the rare earth elements; at least one element L selected from Al and Ga; and B. Not less than 60% of the structure of the hard magnetic material is composed of a fine crystalline phase having an average grain size of not more than 100 nm and the rest is composed of an amorphous phase. The fine crystalline phase essentially consists of bcc (body-centered cubic structure)-Fe and contains at least $R_2Fe_{14}B_1$.

A hard magnetic material of the present invention may be prepared from a molten metal by quenching, may have a structure essentially consisting of an amorphous phase immediately after quenching, and may have a fine crystalline phase precipitated by heat treatment.

A hard magnetic material of the present invention may have the following composition:

$$Fe_{100-x-y-z}R_xL_yB_z$$

wherein R is at least one element selected from the rare earth elements; L is at least one of Al and Ga; and x, y, and z satisfy the following relationships:

$3 \leq x \leq 40$, $3 \leq y \leq 20$, $0 \leq z \leq 20$ (at %), and $y/z \geq 1.0$.

Not more than 30% of Fe in a hard magnetic material of the present invention may be replaced with Co.

Not more than 80% of B in a hard magnetic material of the present invention may be replaced with C.

It is preferred that y and z in the above composition satisfy $3 \leq y \leq 12$ and $2.5 \leq zL4$, respectively.

DESCRIPTION OF THE PREFERRED EMBODIMENTS

Figure 1:
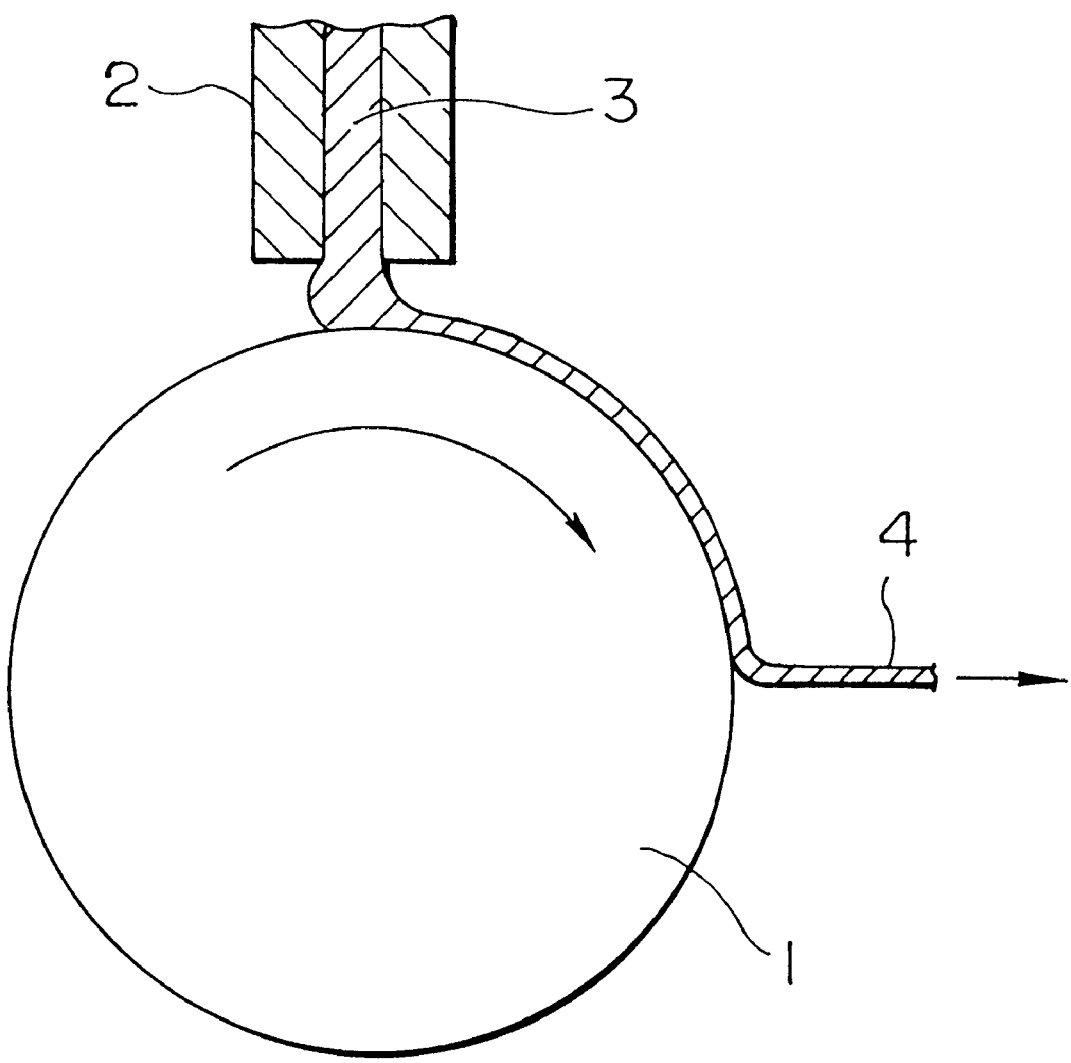
FIG. 1 is a diagram showing a method for producing an amorphous alloy ribbon by quenching.

The present invention will be described in detail with reference to the accompanying drawings.

A hard magnetic material of the present invention contains: Fe as a main component; at least one element R selected from the rare earth elements; at least one element L selected from Al and Ga; and B; and has a structure essentially consisting of an amorphous phase and a fine crystalline phase. Preferably, the fine crystalline phase content is larger than that of the amorphous phase. In other words, it is preferred that not less than 60%, and more preferably, not less than 80% of the structure is of the fine crystalline phase.

A hard magnetic material of the present invention has the following composition:

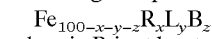

wherein R is at least one element selected from the rare earth elements; L is at least one of Al and Ga; and x, y, and z preferably satisfy the following relationships: $3 \leq x \leq 40$, $3 \leq y \leq 20$, $0 \leq z \leq 20$ (at %), and $y/z \geq 1.0$. More preferably, y satisfies $3 \leq y \leq 12$, and most preferably $3 \leq y \leq 10$, as is mentioned in the latter. Z preferably satisfies $2 \leq z \leq 8$, and most preferably $2.5 \leq z \leq 4$, as is mentioned in the latter. Furthermore, y and z preferably satisfy the relationship of $1.0 \leq y/z \leq 3.0$. In the above composition, 30% of Fe can be replaced with Co and 80% of B can be replaced with C.

In a hard magnetic material of the present invention, it is preferred that not less than 60%, for example 80%, of its structure be composed of a fine crystalline phase having an average grain size of not more than 100 nm, the rest be composed of an amorphous phase, and the fine crystalline phase essentially consist of bcc-Fe and contain at least $R_2Fe_{14}B_1$. This is because at least a 20% amorphous phase is required to precipitate the largest possible quantity of bcc-Fe and $R_2Fe_{14}B_1$, and to have the residual amorphous phase form a net-like shape. Therefore, the residual amorphous phase has the best exchange magnetic coupling when the total of crystalline phases of bcc-Fe, $R_2Fe_{14}B_1$, etc., is 80% and the residual amorphous phase is 20%.

Although a uniform amorphous phase cannot be obtained in a Nd—Fe—B magnet having a material thickness of not more than approximately 20 μm, a Nd—Fe—B magnet containing Al or Ga can attain a uniform amorphous phase even with a material thickness of approximately 500 μm.

The preferred content and the reasons for limitation of each element contained in a hard magnetic material of the present invention will be described below.

Element R (rare earth element)

The preferred content is 3 to 40%. The element R forms a compound with Fe and B and contributes to hard magnetism.

A content of not less than 3% is required to obtain an amorphous phase and precipitate $Nd_2Fe_{14}B_1$. If the content exceeds 40%, magnetization greatly deteriorates, resulting in unsatisfactory magnetic characteristics.

Element L (Al, Ga)

The element L is added for readily obtaining an amorphous phase even when the material thickness is large or the cooling rate is low. The preferred content is 3 to 20% for obtaining a coercive force (iHc) of not less than 800 kA/m, and practically sufficient remanent magnetization (Br) and maximum energy product $((BH)_{max})$. The preferred content of the element L is 3 to 12%, and more preferably 3 to 10%, for obtaining a higher iHc of not less than 1,200 kA/m, and practically sufficient Br and $(BH)_{max}$.

B

B reduces the melting temperature, raises the crystallization temperature, and is responsible for the formation of an amorphous phase. B also renders the crystalline structure uniform and fine after heat treatment. By addition of B, $R_2Fe_{14}B_1$ which contributes to hard magnetism is readily formed. The preferred content of B is 2 to 8% for obtaining a high iHc, Br, and $(BH)_{max}$. In addition, for obtaining not less than 800 kA/m of iHc, not less than 0.3 T of Br, and not less than 20 kJ/m3 of $(BH)_{max}$ the preferred content of B is 2.5 to 4%. Furthermore, B can be partially replaced with C.

Fe

Since Fe is an element responsible for magnetism, the largest possible quantity of Fe is preferably contained in the composition. Moreover, according to the present invention, a small quantity, preferably not exceeding 5%, of Ti, Zr, V, Nb, Ta, Cr, Mo, W, Pt, Pd, Ir, Rh, Os, Ru, Si, P, or the like may be added to the composition for improving corrosion resistance or adjusting magnetostriction.

In general, a hard magnetic material of the present invention can be produced by the following manufacturing processes: quenching or vapor-quenching (e. g., sputtering, depositing, etc.) a melt of an amorphous alloy having the above composition or that of a crystalline alloy containing an amorphous phase; or casting a molten metal to obtain a cast material; followed by heat treatment (annealing) in which the resulting material from the above processes is heated and then cooled to precipitate fine grains.

As is shown in FIG. 1, to produce the above hard magnetic material by quenching, for example, by pressure of an inert gas such as argon, a molten metal 3 is jetted from a nozzle 2 placed on a rotating metallic roll 1 made of steel or copper so that a ribbon 4 is formed by quenching. The resulting ribbon prepared from the molten metal having the above-mentioned composition exhibits a structure essentially consisting of an amorphous phase.

Figure 2:
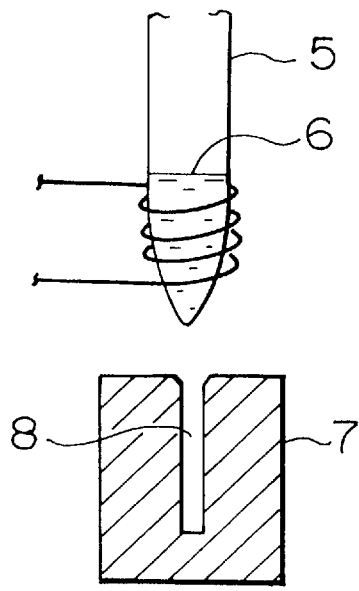
FIG. 2 is a diagram showing a crucible and a mold used for producing an amorphous alloy rod by casting.
Figure 3:
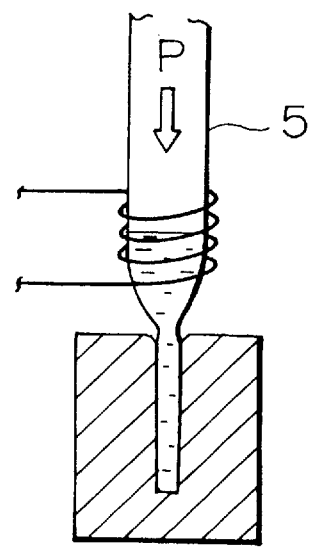
FIG. 3 is a diagram showing a method for producing an amorphous alloy rod by casting.
Figure 4:
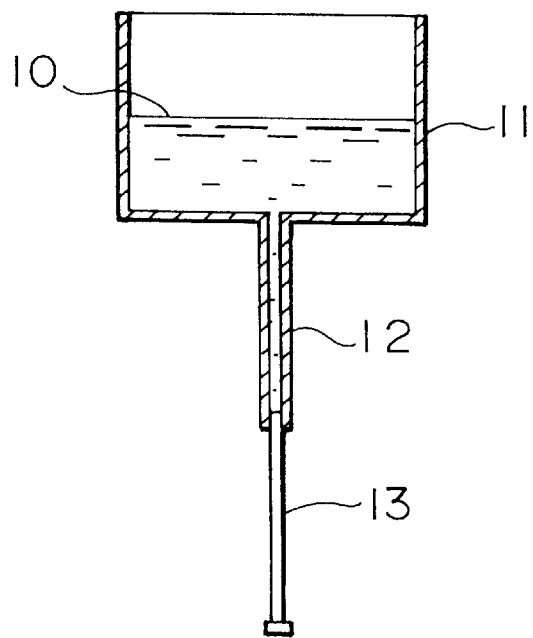
FIG. 4 is a diagram showing another method for producing an amorphous alloy rod by casting.

For producing the hard magnetic material by casting, for example, a molten metal 6 contained in a crucible 5, as is shown in FIG. 2, is cast into a pouring inlet 8 of a mold 7 placed below the crucible 5, as is shown in FIG. 3. Moreover, a thin cast material can also be obtained such that the inside of the crucible 5 is maintained under an inert-gas atmosphere by an inert-gas supply device connecting to the upper portion of the crucible 5, and by elevating the inner pressure of the crucible 5, the molten metal 6 is jetted from a nozzle of the crucible 5 to the pouring inlet 8 of the mold 7, as necessary. Furthermore, an amorphous alloy rod can be obtained as follows: by using a piston 13, a molten metal 10 contained in a container 11 is led to a casting tube 12 provided at the bottom of the container 11 for cooling the molten metal 10, as is shown in FIG. 4.

Hard magnetic materials prepared as above essentially consist of an amorphous phase and can be made into hard magnetic cast materials having a high coercive force by heat treatment. Concerning materials having the above-mentioned composition, it is known that R-Fe type materials have excellent amorphous-phase formability which is further improved by addition of an element L such as Al. A cast material essentially consisting of an amorphous phase can thereby be obtained even when cooling is carried out by casting instead of quenching.

Although casting methods using a crucible and a mold were described in the above, the shapes of the crucible and the mold are not restricted and known continuous casting apparatuses may be employed.

The target hard magnetic materials are obtained as follows: Ribbons or cast materials, which essentially consist of an amorphous phase and which are obtained by the above-mentioned methods, are subjected to heat treatment by heating to not less than the crystallization temperature followed by cooling. The amorphous phase is thereby partially crystallized to precipitate a fine crystalline phase. Due to a fine crystalline phase of $R_2Fe_{14}B_1$ precipitating during the crystallization process, the materials exhibit hard magnetism, resulting in a high coercive force.

In the above-mentioned composition, the amorphous-phase formability of a material essentially consisting of Fe and a rare earth element R is remarkably raised by adding at least one element L selected from Al and Ga. Thus, even when materials are prepared by casting at a lower cooling rate than that of quenching, an amorphous phase can be obtained over a wide composition range, as well as ribbons obtained by quenching. Amorphous bulk bodies thicker than ribbons can thereby be obtained. Therefore, according to the above casting method, a hard magnetic bulk material can be prepared such that a cast bulk body is prepared by cooling a molten metal having a composition of the present invention and then subjecting to heat-treatment to precipitate a fine crystalline phase.

Meanwhile, a hard magnetic bulk material can be also obtained as follows: ribbons or cast materials prepared according to the above-mentioned methods are pulverized, molded, and then heat-treated.

EXAMPLES

Molten metals each having compositions of $Fe_{75-x}Nd_{20}Al_5B_x$ ($0 \leq x \leq 8$), $Fe_{70-x}Nd_{20}Al_{10}B_x$ ($0 \leq x \leq 8$), and $Fe_{74-x}Nd_{20}B_6Al_x$ ($0 \leq x \leq 11$), respectively, were prepared using an arc furnace. According to single-roll liquid quenching, each of the resulting molten metals was blown from a nozzle of a crucible onto the surface of a rotating copper roll to obtain a ribbon sample. The DSC curve (i. e., an exothermic curve measured by a differential scanning calorimeter) of each sample was obtained. Furthermore, a thermo-mechanical analysis using a X ray diffractometer and a TEM (transmission electron microscope) was carried out on each sample. Moreover, each sample was partially crystallized by heat treatment under vacuum to measure its magnetic characteristics by a vibrating sample magnetometer.

Figure 5:
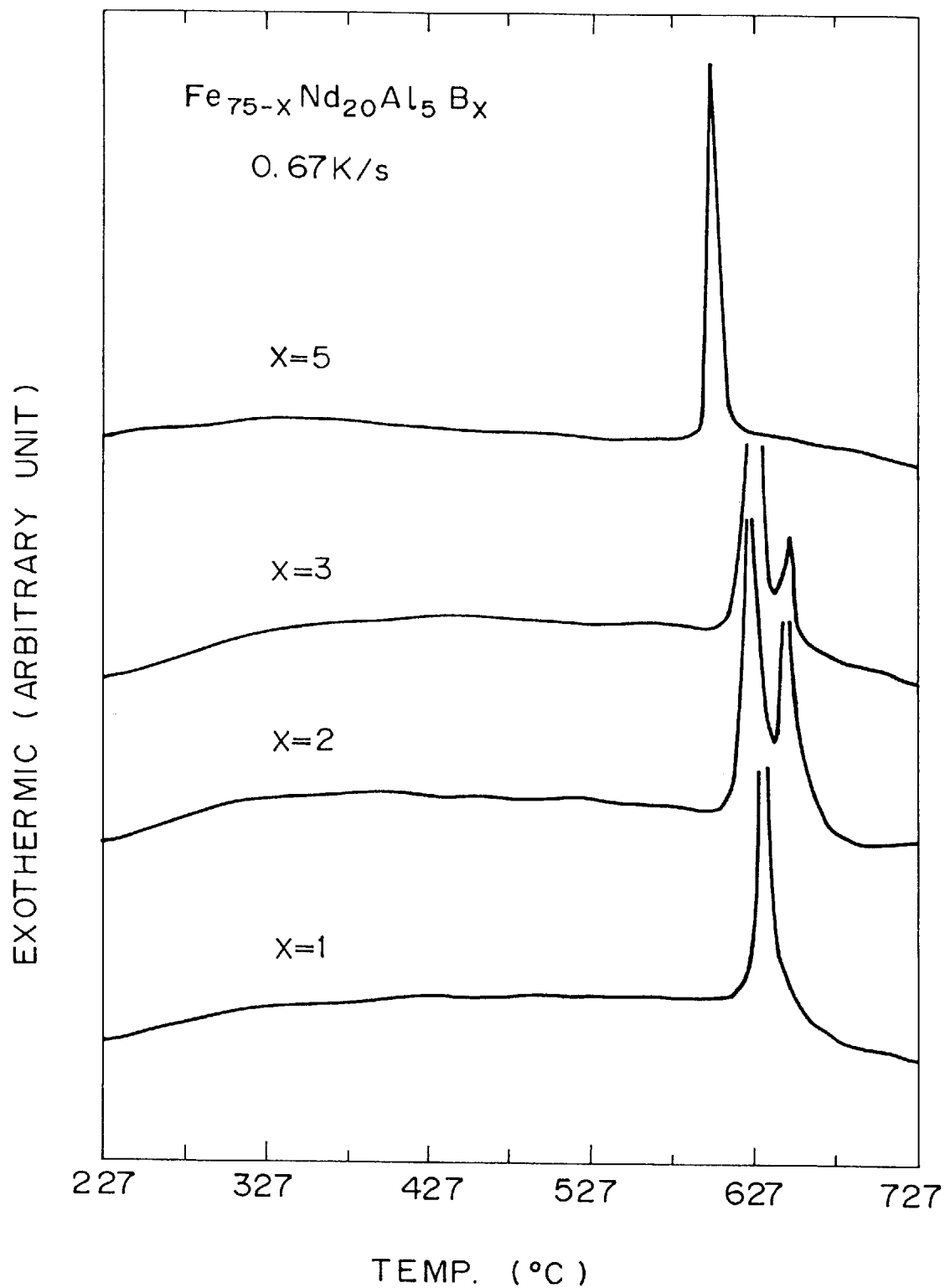
FIG. 5 shows Differential Scanning Calorimetric (DSC) curves of the samples each having a composition of $Fe_{75-x}Nd_{20}Al_5B_x$ wherein x is set to 5, 3, 2, and 1, respectively.

FIG. 5 shows DSC curves of the samples each having a composition of $Fe_{75-x}Nd_{20}Al_5B_x$ wherein x is set to 5, 3, 2, and 1, respectively. It is apparent from the figure that when the B content increases, the crystallization temperature is lowered.

Figure 6:
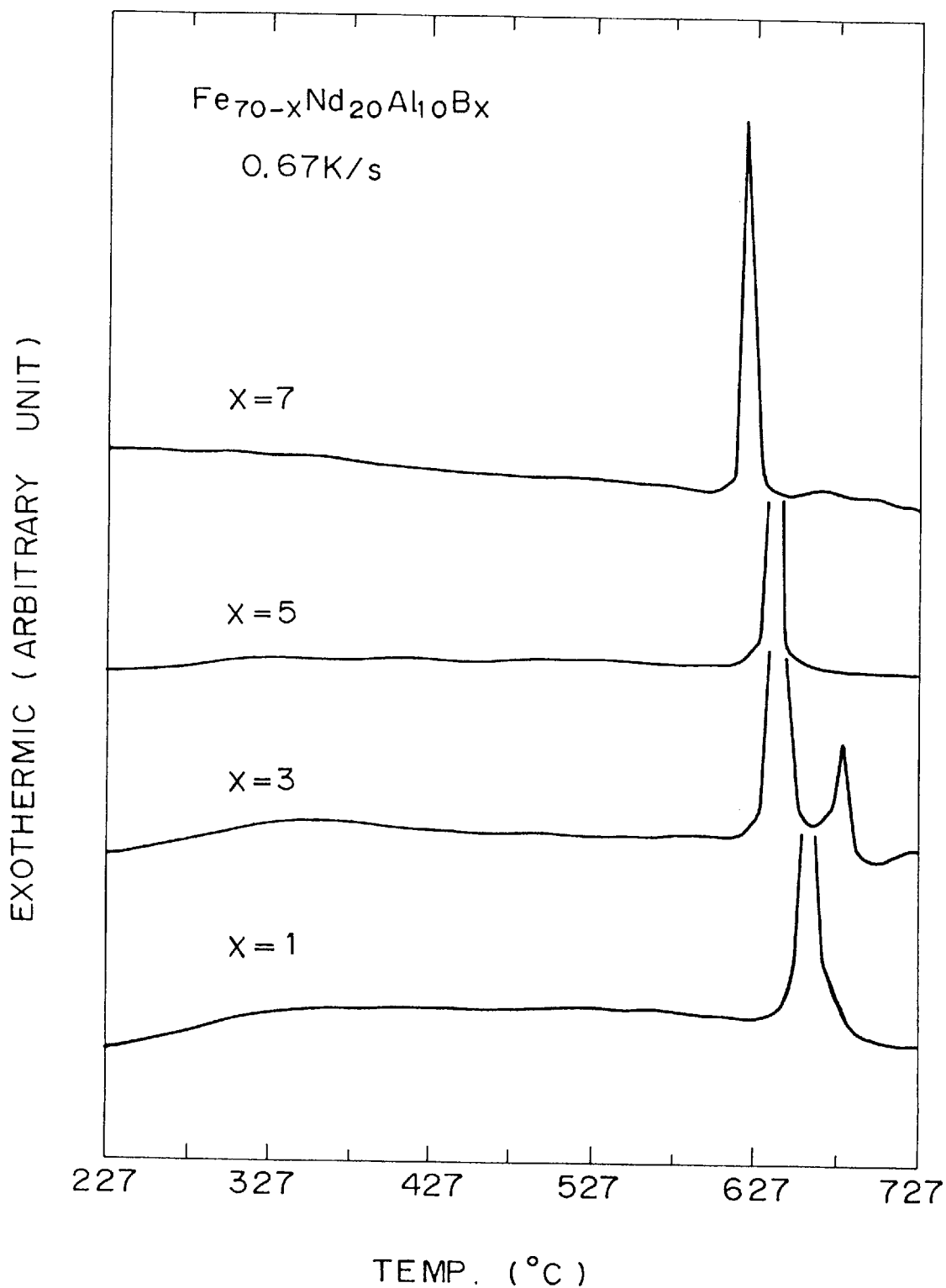
FIG. 6 shows DSC curves of the samples each having a composition of $Fe_{70-x}Nd_{20}Al_{10}B_x$ wherein x is set to 7, 5, 3, and 1, respectively.

FIG. 6 shows DSC curves of the samples each having a composition of $Fe_{70-x}Nd_{20}Al_{10}B_x$, with x being set to 7, 5, 3, and 1, respectively. It is apparent from the figure that when the B content increases the crystallization temperature is lowered.

Therefore, it is understood that since the crystallization temperature can be lowered by adding a larger quantity of B to the above composition, heat treatment can be carried out at a lower temperature, resulting in easier temperature control.

Figure 7:
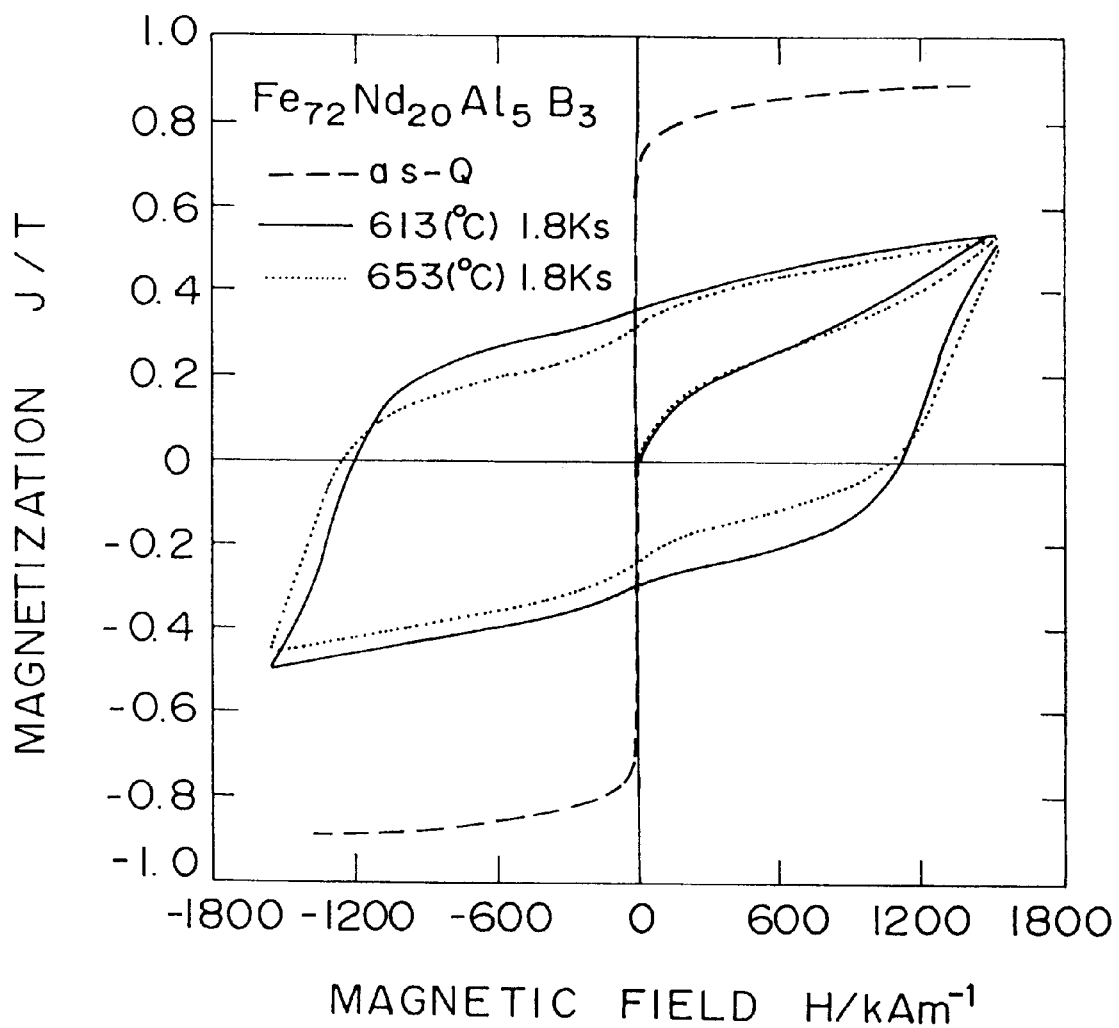
FIG. 7 shows a comparison of magnetization curves of a sample as quenched (as-Q), an annealed sample obtained by heating to 612° C. followed by gradually cooling at 1.8 Ks, and another annealed sample obtained by heating to 653° C. followed by gradually cooling at 1.8 Ks, each of which samples has a composition of $Fe_{72}Nd_{20}Al_5B_3$.

FIG. 7 shows a comparison of magnetization curves of samples having a composition of $Fe_{72}Nd_{20}Al_5B_3$, in other words, a sample as quenched (as-Q), an annealed sample obtained by heating to 612° C. followed by gradually cooling at 1.8 Ks, and another annealed sample obtained by heating to 653° C. followed by gradually cooling at 1.8 Ks.

It is apparent from the results shown in FIG. 7 that samples having a composition of $Fe_{72}Nd_{20}Al_5B_3$ become hard magnetic by heat treatment. However, when the sample is heated to as high as 653° C., a compound not contributing to hard magnetism, such as $Nd_2Fe_{15}Al_2$ described in the latter, starts precipitating. The hard magnetic characteristics, in particular the remanent magnetization (Br), thereby deteriorates.

Figure 8:
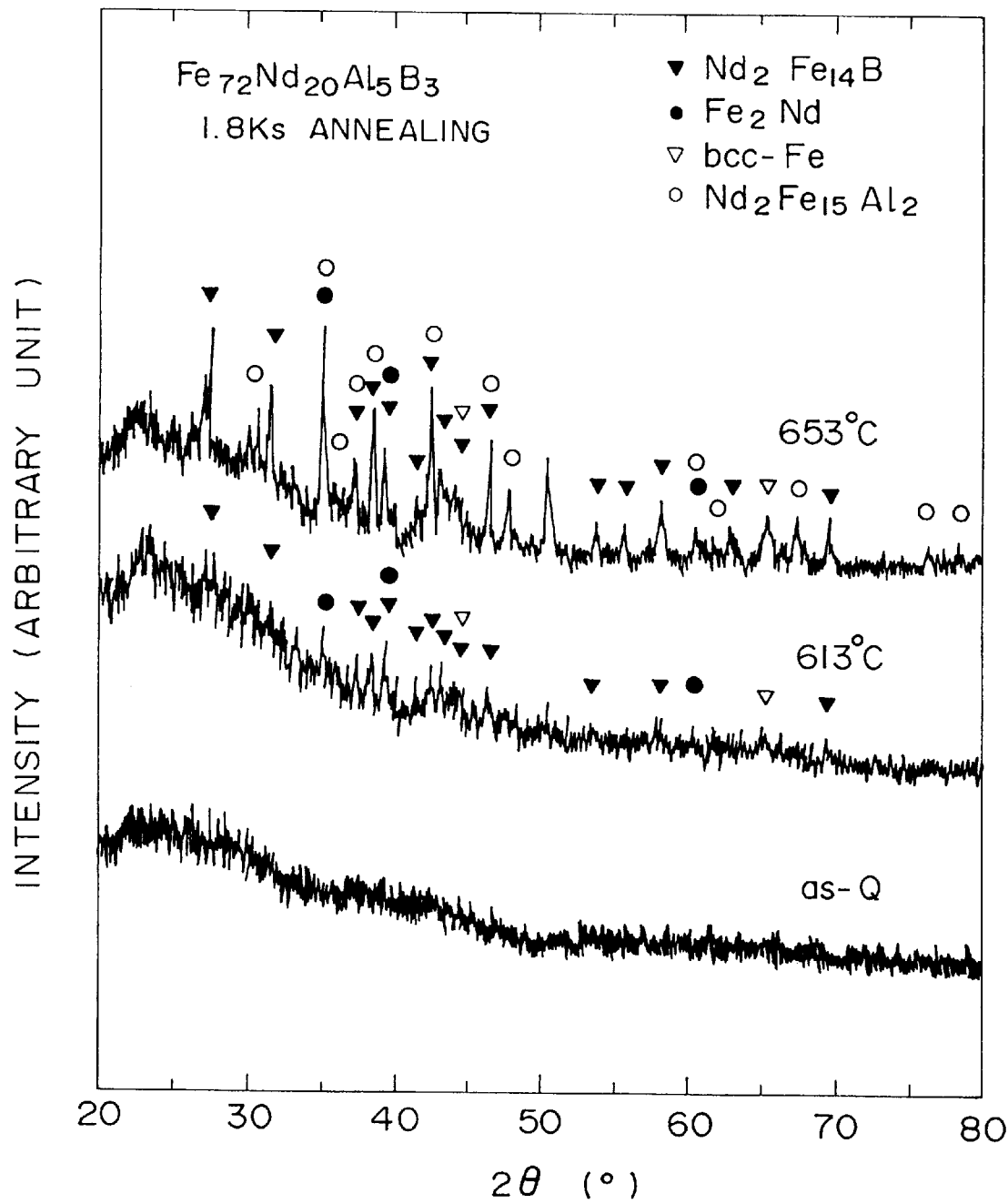
FIG. 8 shows the X-ray diffraction patterns of samples which have a composition of $Fe_{72}Nd_{20}Al_5B_3$ and which are heat-treated at different temperatures.

FIG. 8 shows the X-ray diffraction patterns of each sample having the above-mentioned composition. The sample as quenched (as-Q) has a broad waveform which is specific to an amorphous phase. Meanwhile, the sample heat-treated at 613° C. and that heat-treated at 653° C. show numerous peaks due to crystalline phases. The peak indicated by ▽ supports the existence of bcc-Fe, the peak indicated by ○ supports the existence of $Nd_2Fe_{15}Al_2$, the peak indicated by ● supports the existence of $Fe_2Nd$, and the peak indicated by ▼ supports the existence of $Nd_2Fe_{14}B_1$. Since the hard magnetic characteristics of the sample heat-treated at 613° C. are most superior when determined from the magnetization curves of FIG. 7, $Nd_2Fe_{14}B_1$ most frequently observed in the sample heat-treated at 613° C., as shown in FIG. 8, is regarded to be responsible for the hard magnetism. Meanwhile, since the hard magnetic characteristics of the sample heat-treated at 653° C. deteriorates because of the existence of $Nd_2Fe_{15}Al_2$ most frequently observed in the sample heat-treated at 653° C., $Nd_2Fe_{15}Al_2$ is thought not to contribute to improvement in hard magnetism.

Figure 9:
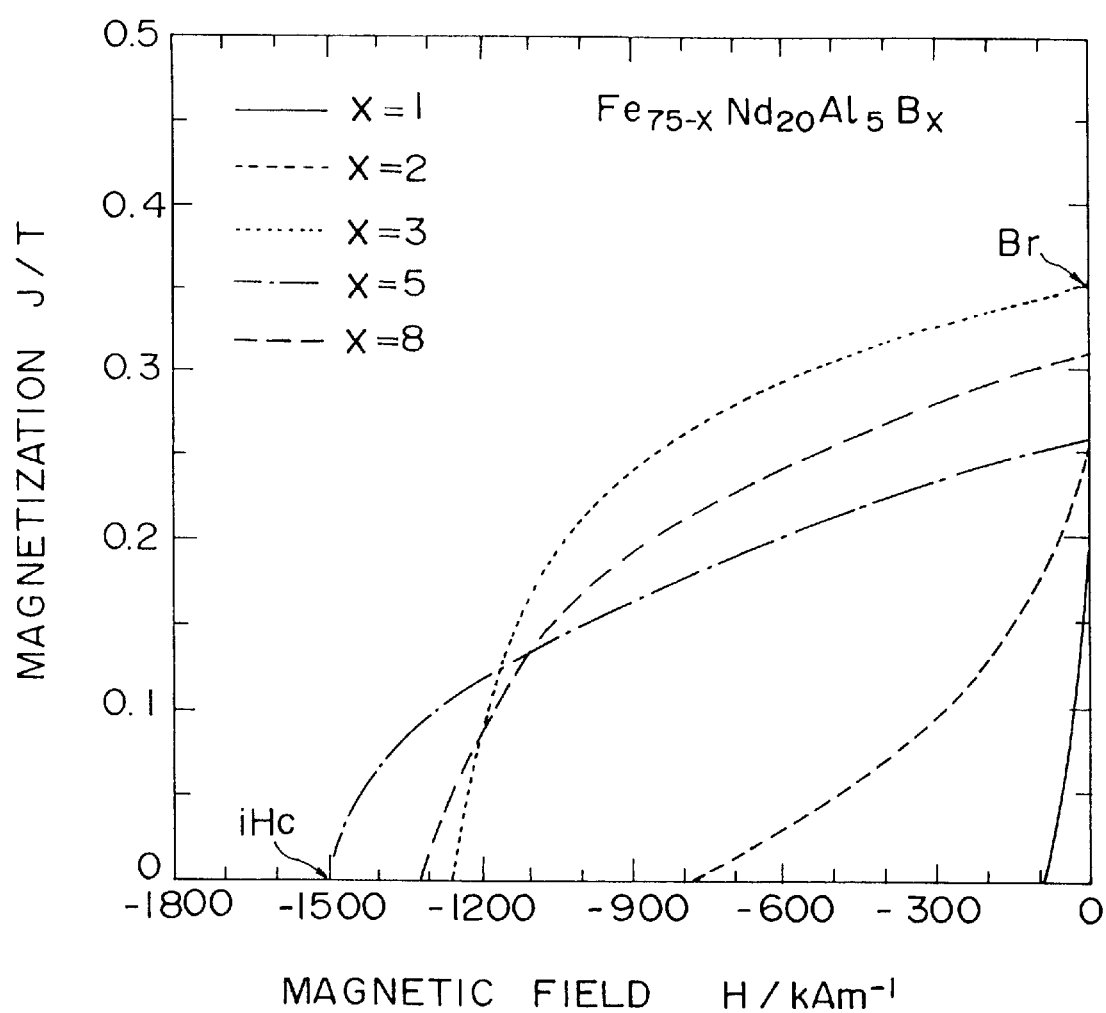
FIG. 9 shows a part of magnetization curves of samples each having a composition of $Fe_{75-x}Nd_{20}Al_5B_x$ wherein x is set to 1, 2, 3, 5, and 8, respectively.

FIG. 9 shows a part of magnetization curves of samples each having a composition of $Fe_{75-x}Nd_{20}Al_5B_x$ wherein x is set to 1, 2, 3, 5, and 8, respectively. In the figure, the intersection of each magnetization curve and the right ordinate indicates the remanent magnetization (Br) and that of each magnetization curve and the abscissa indicates the coercive force iHc. It is apparent that the remanent magnetization (Br) is improved by increasing the B content.

Figure 10:
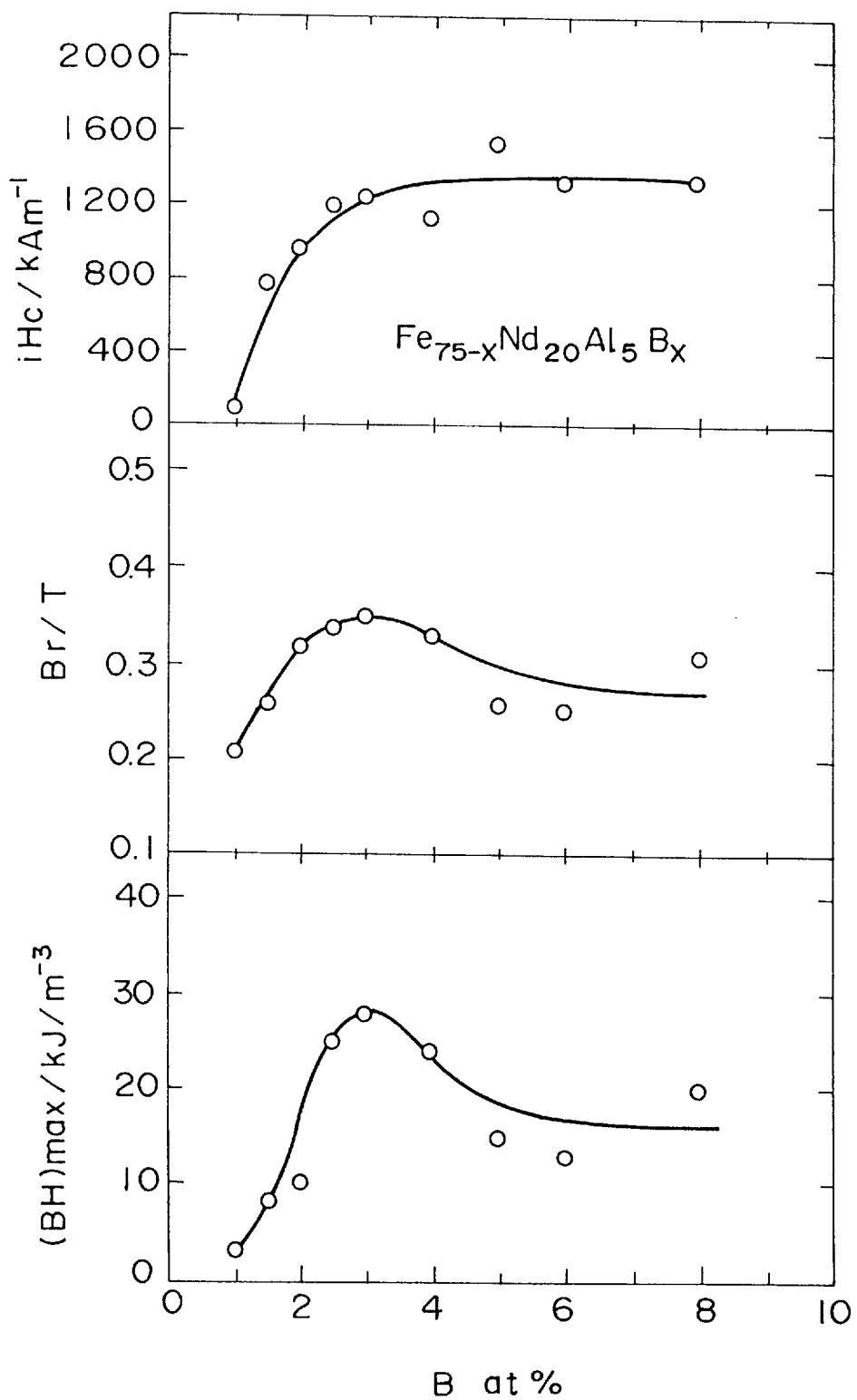
FIG. 10 shows the coercive force (iHc), the remanent magnetization (Br), and the energy product $(BH)_{max}$ of samples having a composition of $Fe_{75-x}Nd_{20}Al_5B_x$ wherein x is varied.

FIG. 10 shows the coercive force (iHc), the remanent magnetization (Br), and the energy product $(BH)_{max}$ of samples having a composition of $Fe_{75-x}Nd_{20}Al_5B_x$ wherein x is varied.

It is understood from the figure that practically sufficient maximum energy product $(BH)_{max}$, remanent magnetization (Br), and coercive force (iHc) can be obtained by adding 2 to 8 at % of B. Moreover, addition of 2.5 to 4.0 at % of B is more preferably to obtain not less than 20 kJ/m³ of maximum energy product $(BH)_{max}$, not less than 0.3 T of remanent magnetization, and not less than 1,200 kA/m of coercive force.

Figure 11:
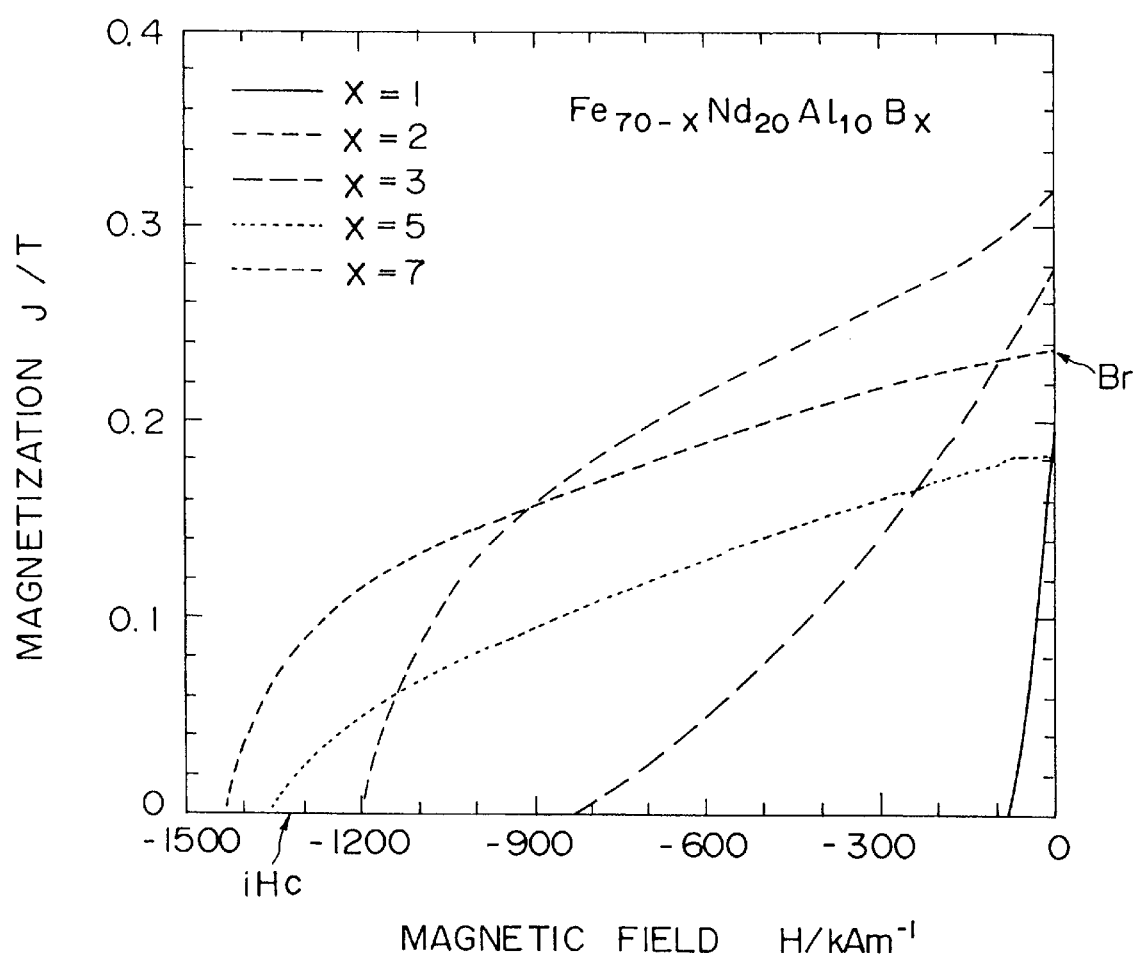
FIG. 11 shows a part of magnetization curves of samples each having a composition of $Fe_{70-x}Nd_{20}Al_{10}B_x$ wherein x is set to 1, 2, 3, 5, and 7, respectively.

FIG. 11 shows a part of magnetization curves of samples each having a composition of $Fe_{70-x}Nd_{20}Al_{10}B_x$ wherein x is set to 1, 2, 3, 5, and 7, respectively. It is understood from the figure that the remanent magnetization (Br) is improved by increasing the B content.

Figure 12:
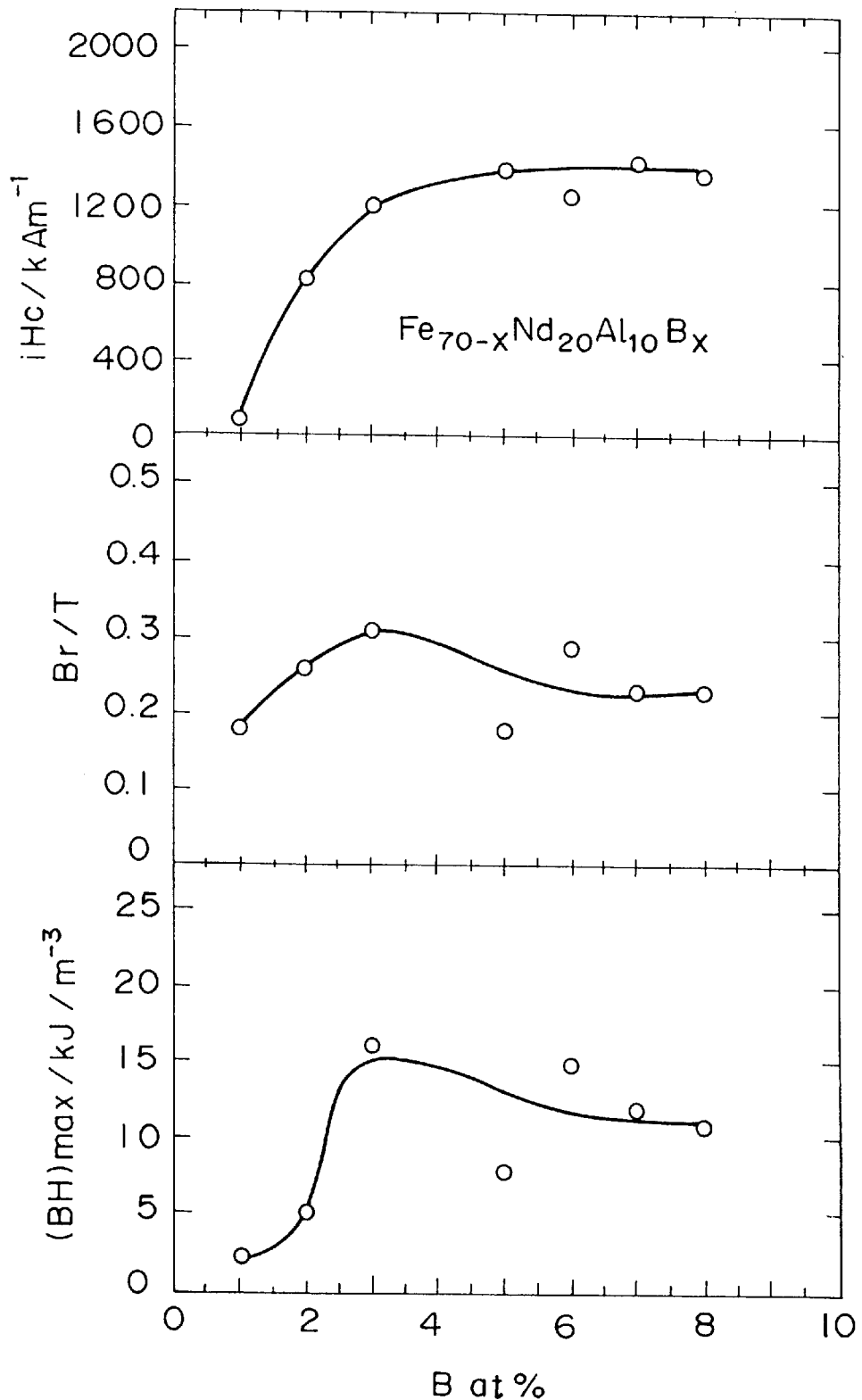
FIG. 12 shows the coercive force (iHc), the remanent magnetization (Br), and the maximum energy product $(BH)_{max}$ of samples having a composition of $Fe_{70-x}Nd_{20}Al_{10}B_x$ wherein x is varied.

FIG. 12 shows the coercive force (iHc), the remanent magnetization (Br), and the maximum energy product $(BH)_{max}$ of samples having a composition of $Fe_{70-x}Nd_{20}Al_{10}B_x$ wherein x is varied.

It is understood from the figure that practically sufficient maximum energy product $(BH)_{max}$, remanent magnetization (Br), and coercive force (iHc) can be obtained by adding 2 to 8 at % of B.

Figure 13:
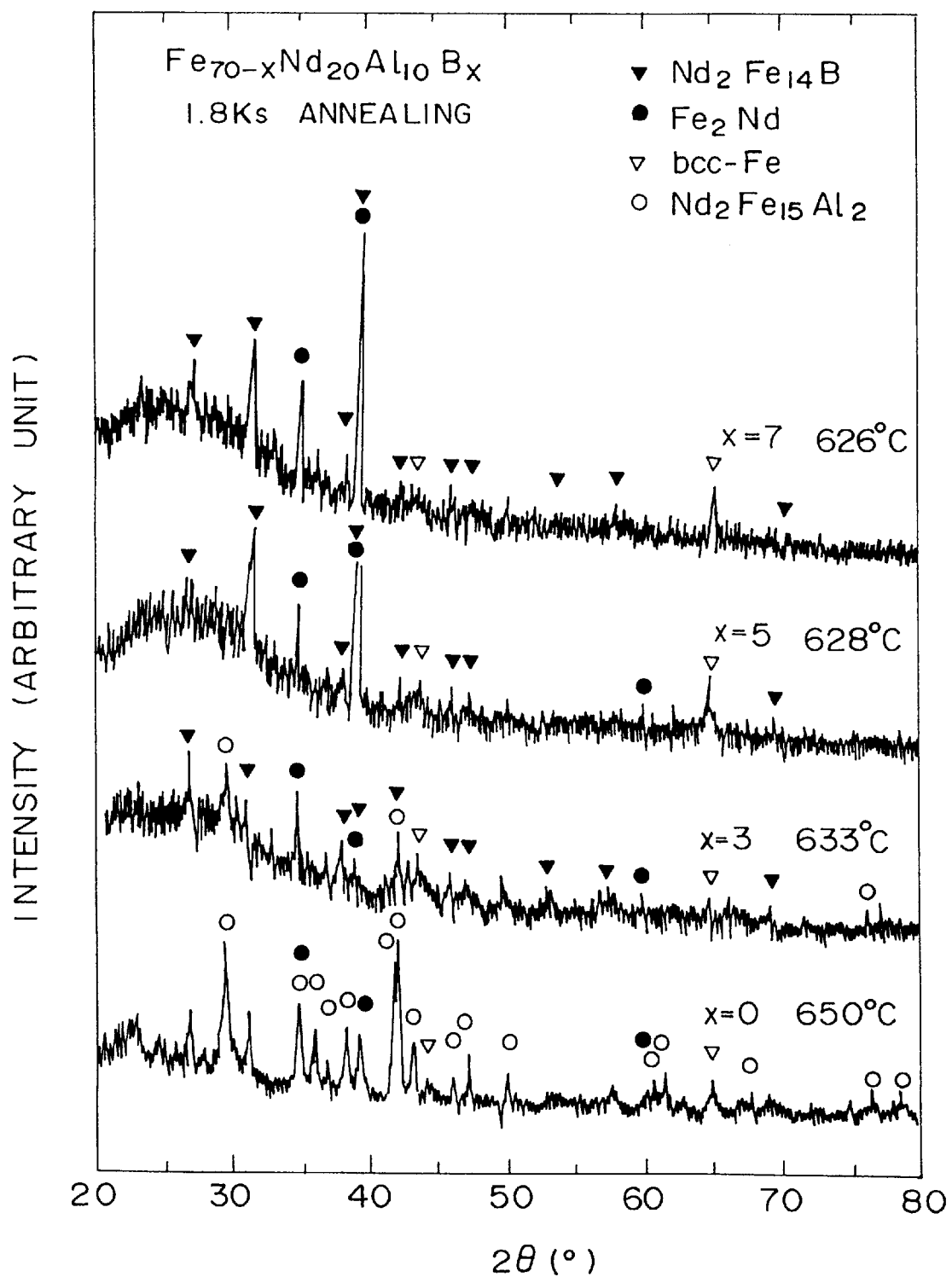
FIG. 13 shows X-ray diffraction patterns of samples having a composition of $Fe_{70-x}Nd_{20}Al_{10}B_x$ with x being set to 7, 5, 3, and o while lowering the heat-treatment temperature according to an increase in the B content.

FIG. 13 shows X-ray diffraction patterns of samples having a composition of $Fe_{70-x}Nd_{20}Al_{10}B_x$ with x being varied while lowering the heat-treatment temperature according to an increase in the B content.

It is understood from the figure that when the B content increases, $Nd_2Fe_{14}B_1$ and bcc-Fe precipitate at a low heat-treatment temperature, and furthermore, $Nd_2Fe_{15}Al_2$ non-contributing to the hard magnetism does not precipitate. Therefore, in a composition of the present invention, B apparently contributes to improvement in hard magnetism.

Figure 14A:
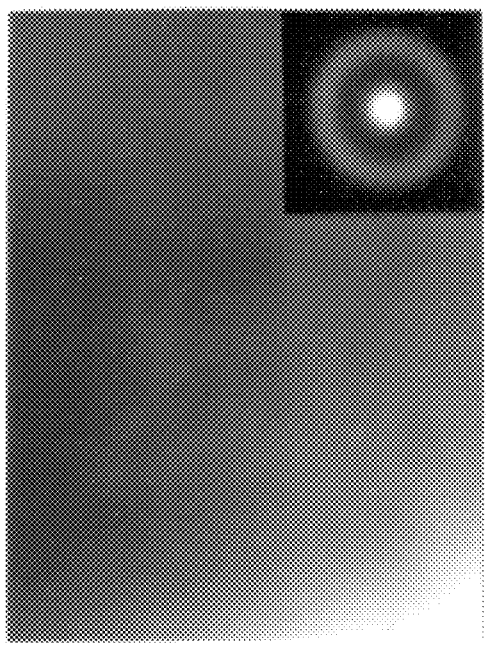
FIG. 14a is a bright-field electromicrophotograph showing a metallic structure of a sample of $Fe_{74.5}Nd_{20}Al_5B_{0.5}$ as quenched.
Figure 14B:
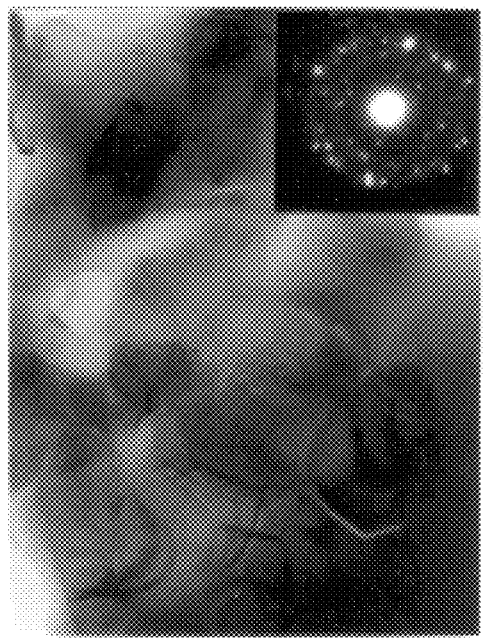
FIG. 14b is a bright-field electromicrophotograph showing a metallic structure of a sample of $Fe_{74.5}Nd_{20}Al_5B_{0.5}$ heat-treated at 613°C.
Figure 14C:
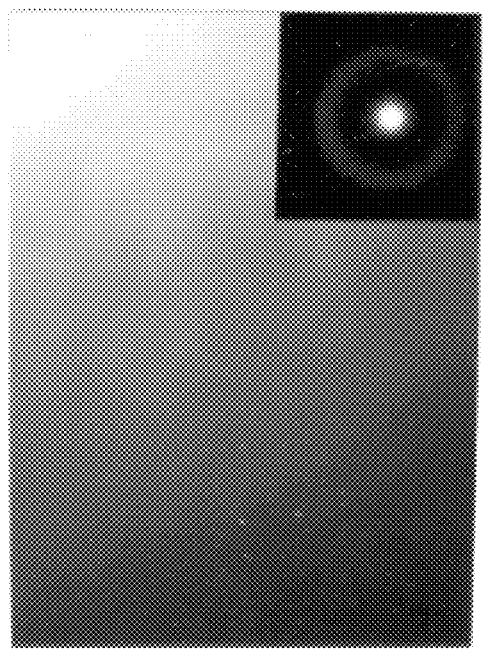
FIG. 14c is a bright-field electromicrophotograph showing a metallic structure of a sample of $Fe_{72}Nd_{20}Al_5B_3$ as quenched.
Figure 14D:
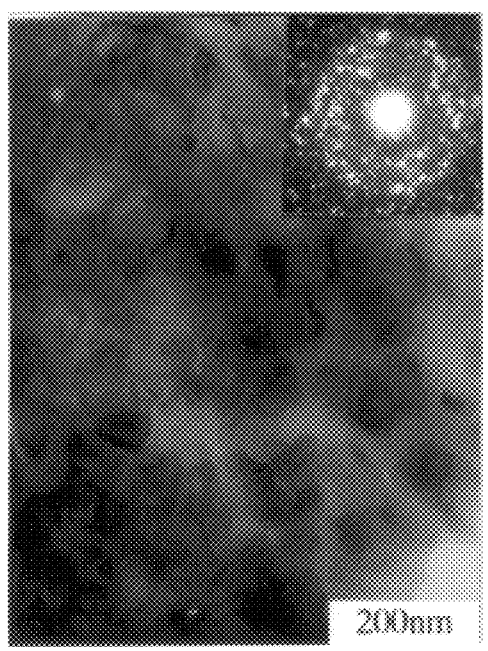
FIG. 14d is a bright-field electromicrophotograph showing a metallic structure of a sample of $Fe_{72}Nd_{20}Al_5B_3$ heat-treated at 653° C.

FIGS. 14a to 14d are bright-field electromicrophotographs showing metallic structures of hard magnetic materials of the present invention. FIG. 14a shows a sample of $Fe_{74.5}Nd_{20}Al_5B_{0.5}$ as quenched, FIG. 14b shows a sample of $Fe_{74.5}Nd_{20}Al_5B_{0.5}$ heat-treated at 613° C., FIG. 14c shows a sample of $Fe_{72}Nd_{20}Al_5B_3$ as quenched, and FIG. 14d shows a sample of $Fe_{72}Nd_{20}Al_5B_3$ heat-treated at 653° C.

From the above electromicrophotographs, crystalline phases can be confirmed in the heat-treated samples, and a uniform structure without grain boundaries specific to an amorphous phase can be confirmed in non heat-treated samples.

Figure 15:
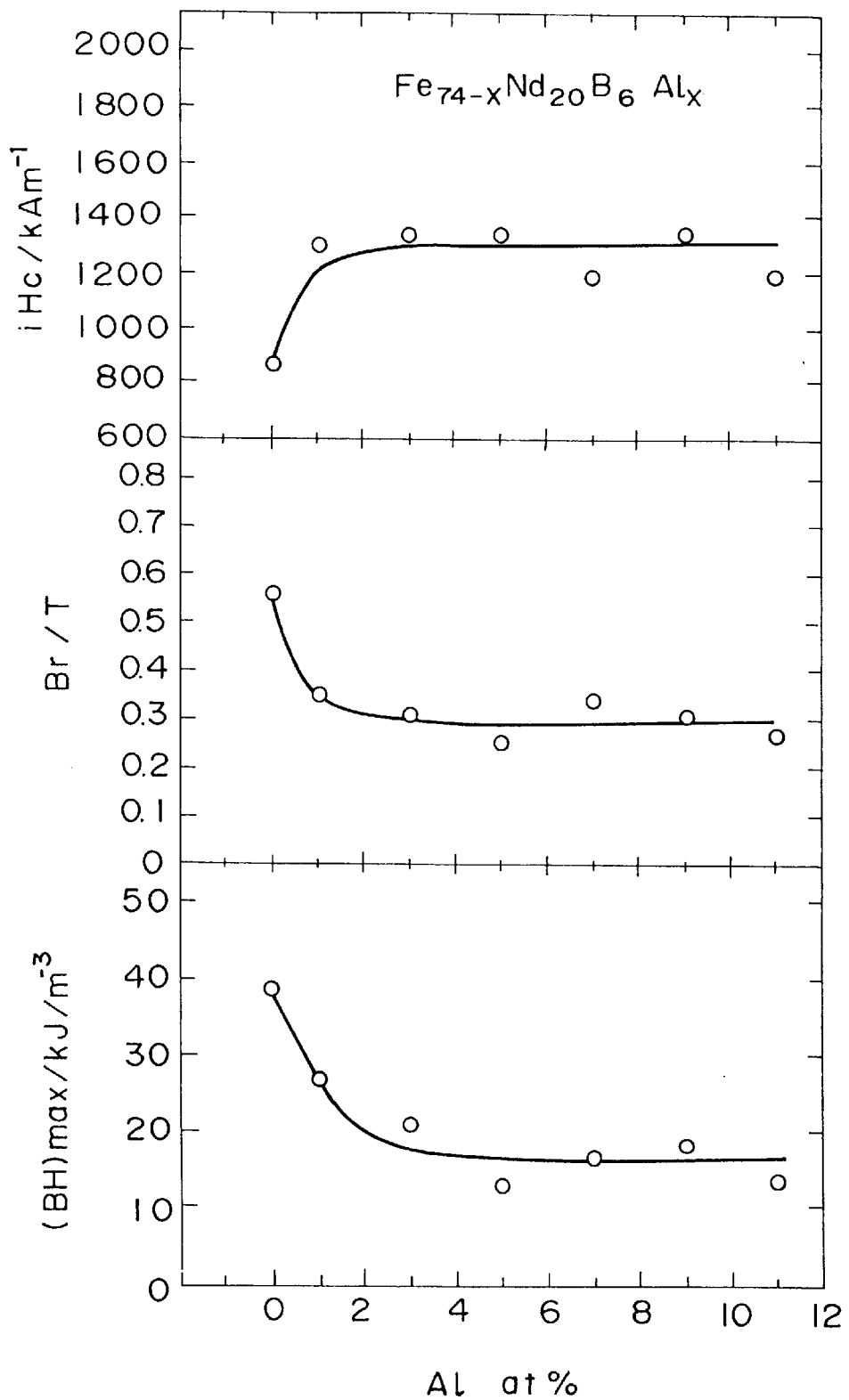
FIG. 15 shows the coercive force (iHc), the remanent magnetization (Br), and the maximum energy product $(BH)_{max}$ of samples having a composition of $Fe_{74-x}Nd_{20}Al_xB_6$ wherein x is varied.

FIG. 15 shows the coercive force (iHc), the remanent magnetization (Br), and the maximum energy product $(BH)_{max}$ of samples having a composition of $Fe_{74-x}Nd_{20}Al_xB_6$ wherein x is varied.

It is understood from the figure that although Al contributes to the amorphous-phase formability, an excessively high quantity of Al deteriorates the magnetic characteristics. The Al content is preferably not more than 5 at %, and more preferably, from 1 to 3 at % to obtain practically sufficient maximum energy product $(BH)_{max}$ and remanent magnetization (Br), and a high coercive force (iHc).

Figure 16:
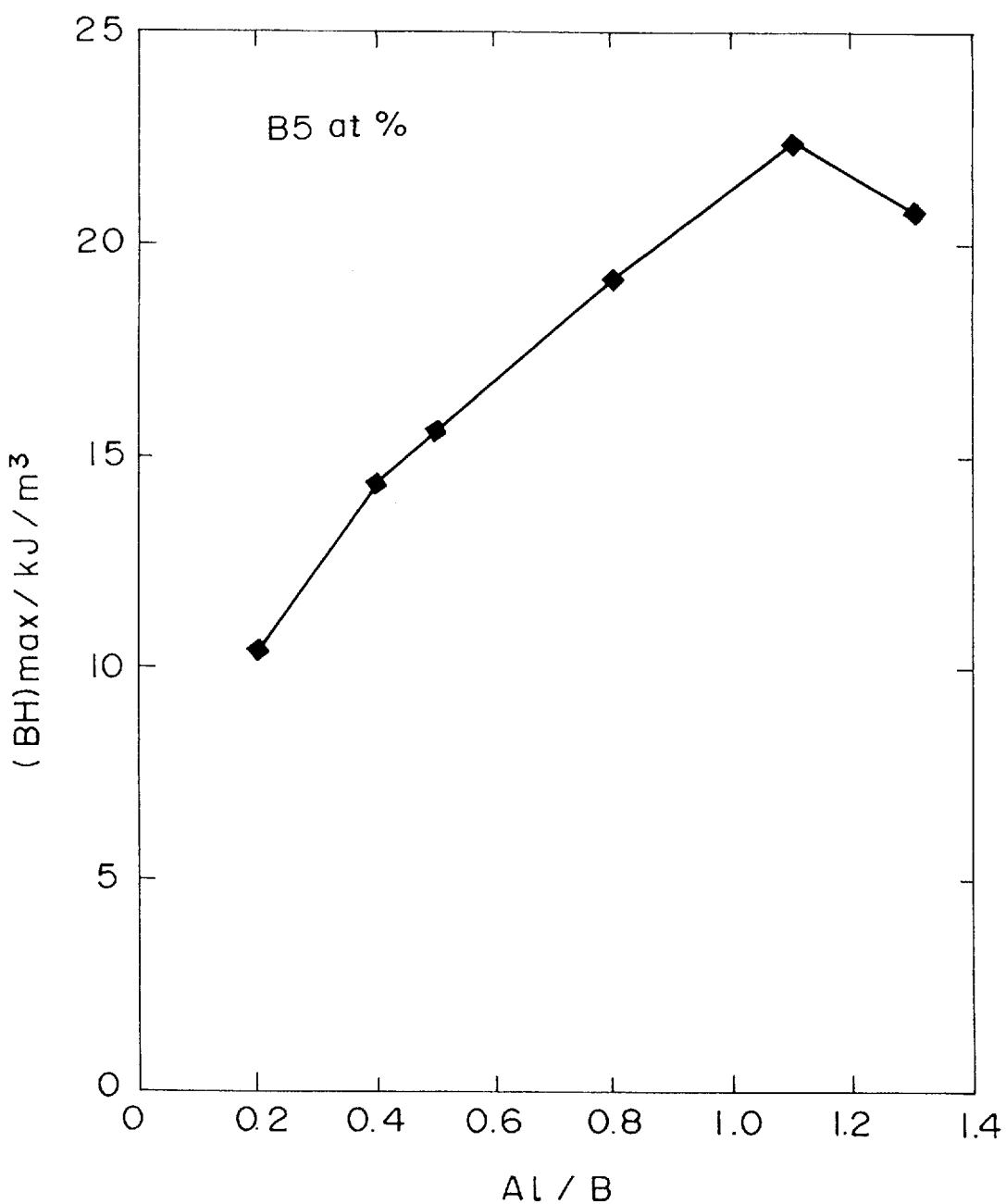
FIG. 16 shows the relationship between $(BH)_{max}$ and the ratio of Al to B with B being fixed at 5 at %.

FIG. 16 shows the relationship between $(BH)_{max}$ and the ratio of Al to B with B being fixed at 5 at %. It is apparent from the figure that the $(BH)_{max}$ values of samples satisfying $Al/B \geq 1.0$ are higher than those of samples satisfying $Al/B < 1.0$.

Figure 17:
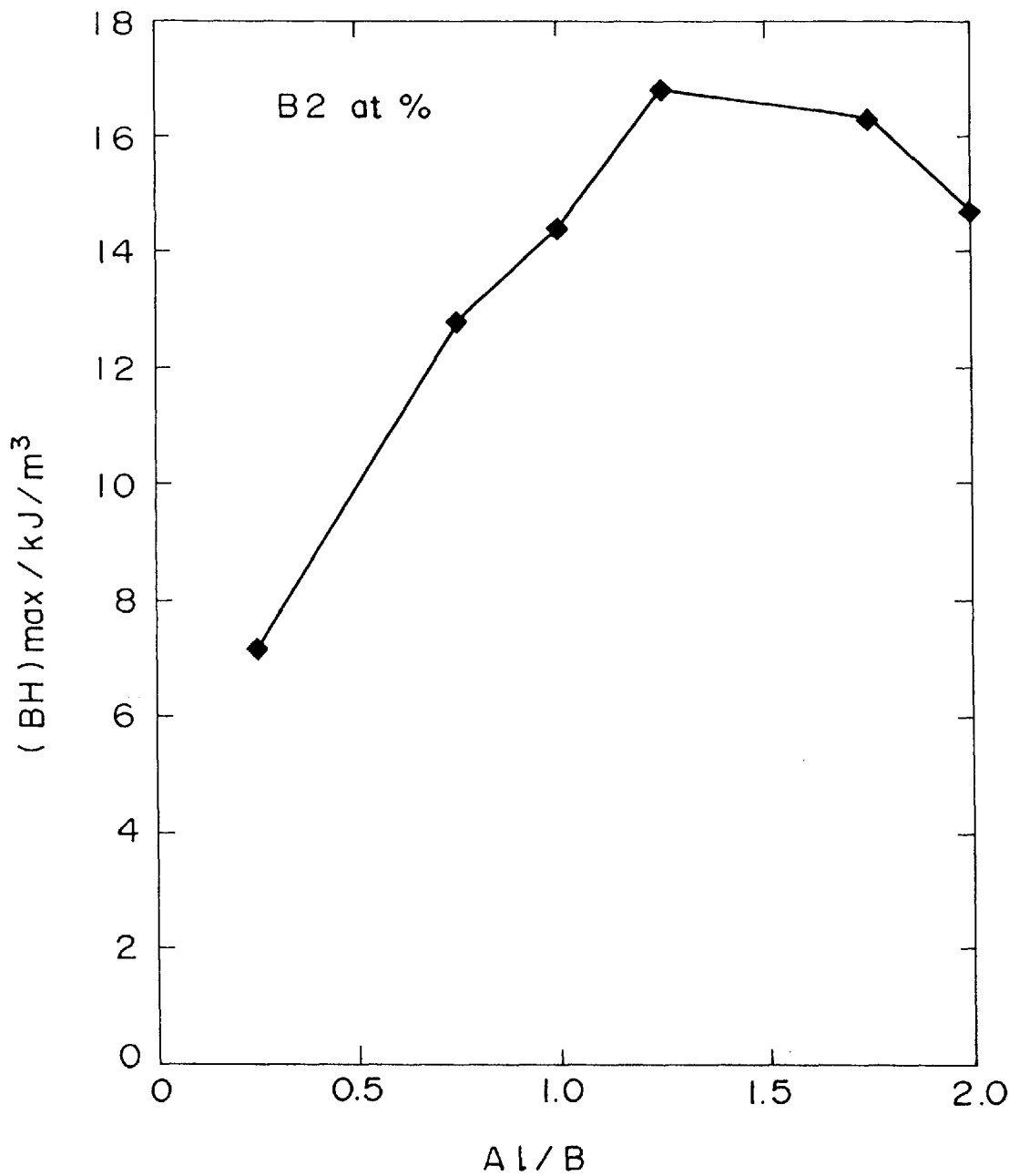
FIG. 17 shows the relationship between $(BH)_{max}$ and the ratio of Al to B with B being fixed at 2 at %.

FIG. 17 shows the relationship between $(BH)_{max}$ and the ratio of Al to B with B being fixed at 2 at %. It is apparent from the figure that the $(BH)_{max}$ values of samples satisfying $Al/B \geq 1.0$ are higher than those of samples satisfying $Al/B < 1.0$.

Figure 18:
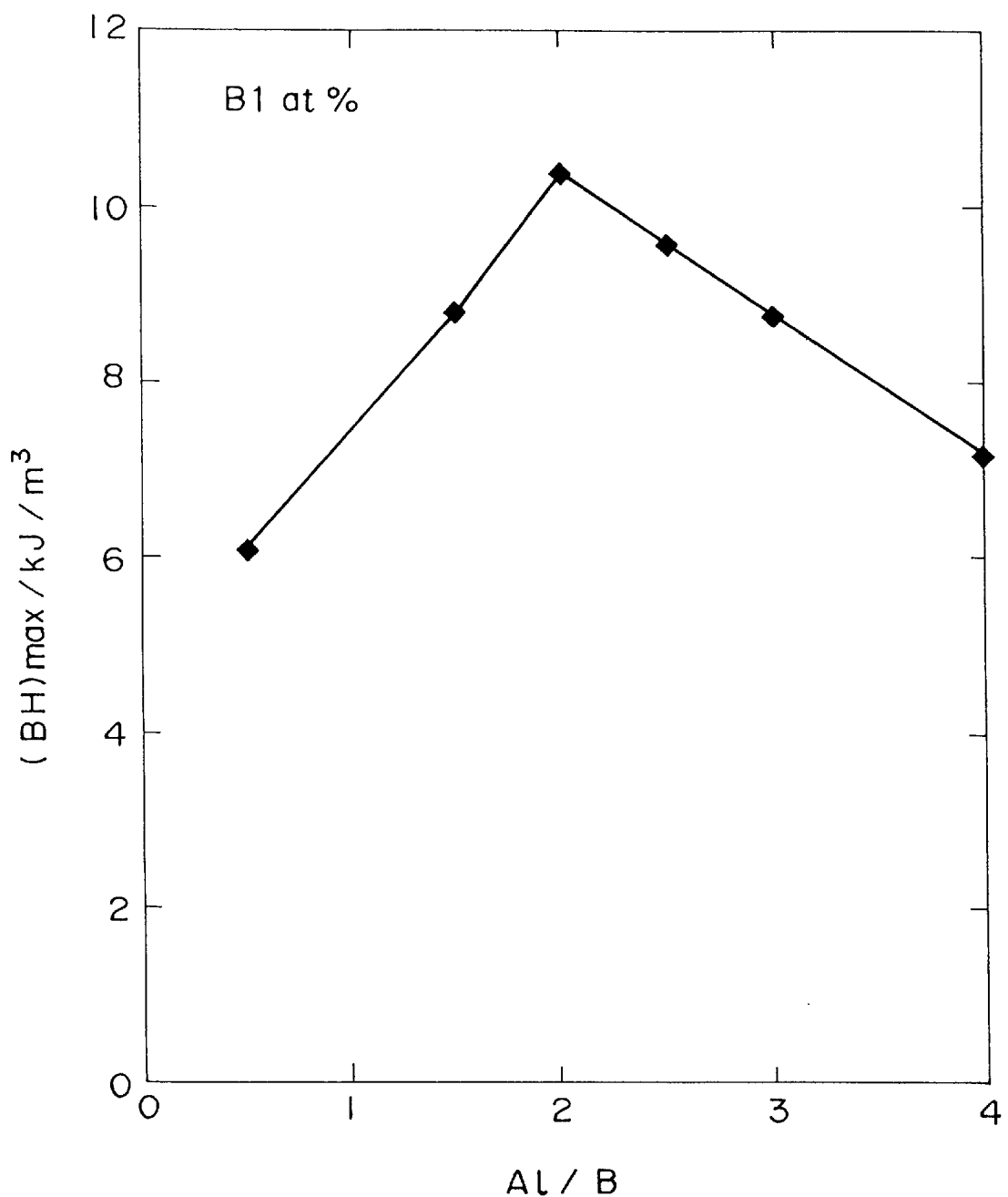
FIG. 18 shows the relationship between $(BH)_{max}$ and the ratio of Al to B with B being fixed at 1 at %.

FIG. 18 shows the relationship between $(BH)_{max}$ and the ratio of Al to B with B being fixed at 1 at %. It is apparent from the figure that the $(BH)_{max}$ values of samples satisfying $Al/B \geq 1.0$ are higher than those of samples satisfying $Al/B < 1.0$. In particular, high $(BH)_{max}$ values are obtained in samples satisfying $1.0 \leq Al/B \leq 3.0$.

As described in the above, a hard magnetic material of the present invention contains Fe, elements R and L, and B; precipitates a fine crystalline phase essentially consisting of bcc-Fe; and comprises at least $R_2Fe_{14}B_1$. Thus, a fine crystalline phase can be obtained over a wide composition range by partially crystallizing an amorphous phase according to various cooling methods. The resulting material exhibits excellent hard magnetic characteristics due to the existence of a compound having a composition of $R_2Fe_{14}B_1$.

In addition, when an amorphous phase is partially crystallized by heat treatment, a compound having a composition of $R_2Fe_{14}B_1$ reliably precipitates, resulting in high hard magnetic characteristics.

When the above-mentioned composition of $Fe_{100-x-y-z}R_xL_yB_z$ satisfies $3 \leq x \leq 40$, $3 \leq y \leq 20$, $0 \leq z \leq 20$ (at %), and $y/z \geq 1.0$, the resulting hard magnetic material achieves a high coercive force and remanent magnetization, and excellent maximum energy product.

In the above composition, a part of Fe may be replaced with Co and a part of B may be replaced with C.

When an alloy is obtained by cooling a molten metal having the above composition, an amorphous phase of the resulting alloy can be crystallized by heat treatment. A compound having a composition of $R_2Fe_{14}B_1$ thereby precipitates, producing a hard magnetic material with hard magnetic characteristics.

Furthermore, a molten metal can be reliably rendered amorphous by cooling and forming into a ribbon according to a quenching method. By heat-treating the resulting ribbon, a compound having a composition of $R_2Fe_{14}B_1$ reliably precipitates, thus producing a hard magnetic material having excellent hard magnetic characteristics.

What is claimed is:

1. A hard magnetic material comprising: $Fe_{100-x-y-z}R_xL_yB_z$, said hard magnetic material having:

Fe as a main component;

at least one element R selected from the rare earth elements;

at least one element L selected from Al and Ga;

and B;

and x, y, and z satisfy the following relationships:
       $3 \leq x \leq 40$, $3 \leq y \leq 20$, $1 \leq z \leq 3$, and $y/z \geq 1.0$; and
       not less than 60% of the structure of said hard magnetic material being a fine crystalline phase having an average grain size of not less than 100 nm, the rest being an amorphous phase, said hard magnetic material essentially consisting of bcc-Fe and containing at least $R_2Fe_{14}B$, wherein said hard magnetic material has been prepared from a molten metal by quenching, said hard magnetic material has a structure essentially consisting of an amorphous phase immediately after quenching, and has said fine crystalline phase precipitated by heat treatment.

2. A hard magnetic material according to claim 1, wherein not more than 30% of said Fe is replaced with Co.

3. A hard magnetic material according to claim 1, wherein not more than 80% of said B is replaced with C.

4. A hard magnetic material according to claim 1, wherein y and z satisfy $3 \leq y \leq 10$ and $2.5 \leq z \leq 3$, respectively.

5. A hard magnetic material according to claim 2, wherein not more than 80% of said B is replaced with C.

6. A hard magnetic material according to claim 2, wherein y and z satisfy $3 \leq y \leq 10$ and $2.5 \leq z \leq 3$, respectively.

7. A hard magnetic material according to claim 2, wherein y and z satisfy $3 \leq y \leq 10$ and $2.5 \leq z \leq 3$, respectively.

\* \* \* \* \*

UNITED STATES PATENT AND TRADEMARK OFFICE
CERTIFICATE OF CORRECTION

PATENT NO.   : 5,976,273
DATED        : November 2, 1999
INVENTOR(S)  : Akira Takeuchi et al.

It is certified that error appears in the above-identified patent and that said Letters Patent is hereby corrected as shown below:

In claim 7, line 1, change "claim 2" to --claim 3--.

Signed and Sealed this

Eleventh Day of July, 2000

Attest:

Q. TODD DICKINSON

Attesting Officer          Director of Patents and Trademarks